(12) United States Patent
Vogelmeier et al.

(10) Patent No.: US 10,372,288 B2
(45) Date of Patent: Aug. 6, 2019

(54) SELECTION OF OBJECTS IN A THREE-DIMENSIONAL VIRTUAL SCENE

(75) Inventors: Leonhard Vogelmeier, Dachau (DE); David Wittmann, Munich (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 1030 days.

(21) Appl. No.: 14/343,500

(22) PCT Filed: Sep. 5, 2012

(86) PCT No.: PCT/DE2012/000884
§ 371 (c)(1),
(2), (4) Date: May 6, 2014

(87) PCT Pub. No.: WO2013/034131
PCT Pub. Date: Mar. 14, 2013

(65) Prior Publication Data
US 2014/0250412 A1    Sep. 4, 2014

(30) Foreign Application Priority Data

Sep. 8, 2011  (DE) .......... 10 2011 112 619

(51) Int. Cl.
*G06F 3/048* (2013.01)
*G06F 3/0481* (2013.01)
(Continued)

(52) U.S. Cl.
CPC ...... *G06F 3/04815* (2013.01); *G06F 3/04842* (2013.01); *H04N 13/106* (2018.05); *H04N 13/117* (2018.05); *H04N 13/363* (2018.05); *H04N 13/383* (2018.05); *H04N 13/388* (2018.05)

(58) Field of Classification Search
None
See application file for complete search history.

(56) References Cited

U.S. PATENT DOCUMENTS

| 5,015,188 A | 5/1991 | Pellosie, Jr. et al. |
| 6,031,519 A | 2/2000 | O'Brien |

(Continued)

FOREIGN PATENT DOCUMENTS

| DE | 102 56 659 A1 | 7/2004 |
| DE | 10 2011 112 619 A1 | 3/2013 |

(Continued)

OTHER PUBLICATIONS

Russian-language Russian Office Action issued in Russian counterpart application No. 2014113401/08(020923) dated May 27, 2016 (Six (6) pages).

(Continued)

*Primary Examiner* — William C Trapanese
(74) *Attorney, Agent, or Firm* — Crowell & Moring LLP

(57) ABSTRACT

A representation device for representing and interacting with a three-dimensional virtual scenario includes an input unit and at least one representation region for representing the three-dimensional scenario. A marking element may be moved on a virtual surface area with two translational degrees of freedom such that each virtual object in the three-dimensional virtual scenario may be selected with the marking element.

12 Claims, 3 Drawing Sheets

(51) Int. Cl.
*G06F 3/0484* (2013.01)
*H04N 13/388* (2018.01)
*H04N 13/117* (2018.01)
*H04N 13/363* (2018.01)
*H04N 13/106* (2018.01)
*H04N 13/383* (2018.01)

(56) References Cited

U.S. PATENT DOCUMENTS

| | | | |
|---|---|---|---|
| 6,052,100 | A | 4/2000 | Soltan et al. |
| 6,611,283 | B1 | 8/2003 | Isonuma |
| 6,842,175 | B1 | 1/2005 | Schmalstieg et al. |
| 7,324,085 | B2 | 1/2008 | Balakrishnan et al. |
| 7,348,997 | B1 | 3/2008 | Croft |
| 7,567,701 | B2 | 7/2009 | Fontius |
| 2004/0174605 | A1 | 9/2004 | Olsson |
| 2005/0286101 | A1* | 12/2005 | Garner ............... G03H 1/02 359/9 |
| 2008/0040689 | A1* | 2/2008 | Balakrishnan ...... G02B 27/2271 715/848 |
| 2008/0094398 | A1* | 4/2008 | Ng .................. G06F 3/0486 345/427 |
| 2011/0267338 | A1 | 11/2011 | Nam et al. |
| 2012/0098938 | A1 | 4/2012 | Jin |
| 2012/0154390 | A1 | 6/2012 | Narita et al. |
| 2014/0250412 | A1 | 9/2014 | Vogelmeier et al. |
| 2015/0163475 | A1 | 6/2015 | Krisman |

FOREIGN PATENT DOCUMENTS

| | | |
|---|---|---|
| EP | 0 493 822 A1 | 7/1992 |
| EP | 1 450 331 A1 | 8/2004 |
| JP | 2011-175617 A | 9/2011 |
| RU | 2 355 030 C2 | 5/2009 |
| RU | 2 451 982 C1 | 5/2012 |
| WO | WO 2009/062492 A2 | 5/2009 |

OTHER PUBLICATIONS

Nguyen-Thong Dang, "A Stereoscopic 3D Visualization Environment for Air Traffic Control", Thesis, Ecole Pratique des Hautes Etudes, 2005, Paris (One hundred seventy-seven (177) pages).
International Search Report including English Translation dated Jan. 25, 2013 (Six (6) pages).
Russian Notice of Allowance issued in Russian counterpart application No. 2014113401/08(020923) dated Jan. 17, 2017 (Seven (7) pages).
European Office Action issued in European counterpart application No. 12 778 599.6-1903 dated Feb. 15, 2017 (Six (6) pages).
Canadian Search Report issued in Canadian counterpart application No. 2,847,421 dated Jul. 25, 2018 (Four (4) pages).

* cited by examiner

SELECTION OF OBJECTS IN A THREE-DIMENSIONAL VIRTUAL SCENE

FIELD OF THE INVENTION

Exemplary embodiments of the invention relate to a representation device for representing a three-dimensional virtual scenario and for interacting with the three-dimensional virtual scenario, a workstation device for representing and operating a three-dimensional virtual scenario, the use of a workstation device for representing and monitoring air spaces, as an air traffic control workstation and for monitoring unmanned aircraft, and to a method for selecting virtual objects in a three-dimensional virtual scenario.

BACKGROUND OF THE INVENTION

Stereoscopic visualization techniques are used to create the impression of a three-dimensional scenario in a viewer of a stereoscopic display. The viewer experiences the three-dimensional impression in that the viewer's eyes perceive different images.

Interaction with three-dimensional virtual objects in a three-dimensional virtual scenario requires the input of three translational degrees of freedom because, compared to a two-dimensional scenario, the three-dimensional scenario also has a dimension of depth. The input of three degrees of freedom requires special interaction devices and/or methods since conventional interaction devices, such as a so-called computer mouse or a so-called trackball, provide only two translational degrees of freedom.

SUMMARY OF THE INVENTION

Exemplary embodiments of the invention are directed to a representation device for representing a three-dimensional virtual scenario and for interacting with this three-dimensional virtual scenario, which representation device offers an alternative interaction possibility with the three-dimensional virtual scenario.

Many of the features described for the representation device and the workstation device may also be implemented as method steps and vice versa.

In accordance with a first aspect of the invention, a representation device for representing a three-dimensional virtual scenario and for interacting with the three-dimensional scenario is provided that has at least a first representation region for representing the three-dimensional scenario and has an input unit. The input unit is designed for controlling a movement of a marking element in the three-dimensional scenario, which movement has two degrees of freedom, so that each virtual object is selectable in the three-dimensional virtual scenario.

The representation device may of course have more than one representation region, for instance two, three, four, or an even greater number of representation regions.

The representation regions may be a display element designed for stereoscopic visualization. The representation regions may thus be displays or projection surfaces suitable for being used for a stereoscopic visualization technique.

The representation device as described in the foregoing and in the following permits interaction with the virtual objects in a three-dimensional virtual scenario while using an input unit that offers two translational degrees of freedom.

In contrast to a rotational degree of freedom, a translational degree of freedom means that a body moves in one direction when performing a translational movement.

Movement of a marking element with two translational degrees of freedom shall be construed to mean the movement of a marking element along a surface area. In other words, a marking element may move on a surface area along a first direction and along a second direction, a movement vector for the first direction and a movement vector for the second direction being perpendicular to one another. Naturally a movement in a composite direction is also possible, i.e. a composite movement direction has one component from the first movement vector and one component from the second movement vector.

In other words, this means that marking elements may move along two established movement directions. This means that the marking element has two translational degrees of freedom.

Thus the representation device as described in the foregoing and in the following permits a simple and rapidly learned interaction with a three-dimensional virtual scenario.

The term interaction with a three-dimensional virtual scenario may be construed to mean the selection and manipulation of virtual objects that are disposed in the three-dimensional virtual scenario.

In accordance with one embodiment of the invention, the movement of the marking element having two translational degrees of freedom takes place in a virtual surface area.

The virtual surface area is determined by the two permissible movement directions of the marking element.

The virtual object in the three-dimensional virtual scenario may be selected in that a connecting line is calculated from one eye of the operator of the representation device using the marking element. The movement of the marking element on the virtual surface area changes the position of the connecting line. Likewise, the position of the connecting line changes when the viewer changes the position of his eyes. A virtual object in the three-dimensional virtual scenario is selected in that the connecting line is extended into the three-dimensional virtual scenario and a virtual object is selected when the connecting line intersects the virtual coordinates of the virtual location of the virtual object.

In particular a virtual object may be selected in that a virtual object is looked at, i.e., in that the marking element is moved such that the connecting line intersects the virtual object, and by actuating a selection element on an input element, for instance by pressing a key on a so-called computer mouse, the selection of the virtual object is confirmed.

In accordance with another embodiment of the invention, the virtual surface area is embodied as a plane.

It should be noted that the virtual surface area is merely a notional surface area in the three-dimensional virtual scenario and is defined by the two permissible movement directions of the marking element.

In accordance with another embodiment of the invention, the virtual surface area is embodied as a circular arc.

In the virtual three-dimensional scenario, the virtual surface area thus represents the physical equivalent of a circular arc, that is, a hollow cylinder arc.

Even if the virtual surface area obtains a depth component from the rounded shape, it is possible that the marking element may move from one point on the virtual surface area to any other desired point on the virtual surface area using the specification of two movement directions.

The virtual surface area may be embodied in any desired shape, such as for instance even in the shape of a hemisphere or sphere.

The three-dimensional scenario may, for example, be projected such that the viewer is surrounded by virtual objects, in other words, such that the viewer is disposed in the middle of the three-dimensional virtual scenario. In this case, the virtual surface area may surround the viewer as a sphere and the marking element may be embodied to be moved over the spherical surface.

In accordance with another embodiment of the invention, the arrangement of the virtual surface area may be changed in the three-dimensional virtual scenario.

A change in the arrangement of the virtual surface area in the three-dimensional virtual scenario does not change the fact that the marking element is moved only along the virtual surface area. Since the virtual surface area that is disposed in the three-dimensional virtual scenario may have a depth component, the change to the arrangement of the virtual surface area in the three-dimensional virtual scenario may lead to the marking element having a correspondingly changed movement with respect to the three-dimensional virtual scenario.

If the virtual surface area is for instance a plane, an angle of inclination that the virtual surface area has in the three-dimensional virtual scenario may be changed. Likewise, the position of the virtual surface area in the three-dimensional virtual scenario may be changed.

In accordance with another aspect of the invention, a workstation device for representing and operating a three-dimensional virtual scenario having a representation device for representing a three-dimensional virtual scenario and for interacting with the three-dimensional virtual scenario is provided as described above and in the following.

The workstation device may, for example, be used by one or a plurality of users to control unmanned aircraft or to monitor any desired scenarios.

The workstation device as described in the foregoing and in the following may of course also have a plurality of representation devices, but may also have one or a plurality of conventional displays for representing additional two-dimensionally represented information.

Moreover, the workstation device may have input elements that may be used alternatively or in addition to the interaction, described in the foregoing and in the following, with the three-dimensional virtual scenario.

The workstation device may have a so-called computer mouse, a keyboard, or use-typical interaction devices, for instance those for an air traffic control workstation.

Likewise, the displays or representation units may be conventional displays or touch-sensitive displays or representation units (so-called touchscreens).

In accordance with another aspect of the invention, a workstation device as described in the foregoing and in the following is provided for monitoring air spaces.

In accordance with another aspect of the invention, a workstation device as described in the foregoing and in the following is provided as an air traffic control workstation.

Thus it is possible for an operator of the workstation device to interact in a simple manner with the represented virtual objects, i.e. the aircraft in the region to be monitored and represented, i.e. to select these aircraft and to transmit instructions to the selected aircraft.

In accordance with another aspect of the invention, the use of a workstation device as described in the foregoing and in the following is provided for monitoring and controlling unmanned aircraft.

Thus it is possible for an operator of the workstation device to interact in a simple manner with the represented virtual objects, i.e. the unmanned aircraft in the represented three-dimensional virtual scenario, i.e. to select these aircraft and to transmit instructions to the selected aircraft.

Likewise, the workstation device may also be used for controlling components such as, for example, a camera or other sensors that are components of an unmanned aircraft.

In accordance with another aspect of the invention, a method is provided for selecting virtual objects in a three-dimensional virtual scenario. The method has the following steps: reproducing a marking element in the three-dimensional virtual scenario, moving the marking element with two degrees of freedom along a virtual surface area, selecting a virtual object in the three-dimensional virtual scenario by positioning the marking element in a certain region on the virtual surface area.

In accordance with one embodiment of the invention, the method further has the following step for selecting virtual objects in a three-dimensional virtual scenario: Determining a connecting line from an eye of the viewer to the marking element, wherein determining the connecting line occurs prior to selecting the virtual object and the object is selected in that the marking element is moved on the virtual surface area such that the connecting line intersects a virtual location of the virtual object in the three-dimensional virtual scenario.

In accordance with another aspect of the invention, a computer program element for controlling a representation device for representing a three-dimensional virtual scenario and for interacting therewith as described in the foregoing and in the following is provided that is embodied to perform the method for selecting virtual objects in a three-dimensional virtual scenario as described in the foregoing and in the following when the computer program element is executed on a processor of a computing unit.

The computer program element may instruct a processor of a computing unit to perform the method for selecting virtual objects in a three-dimensional virtual scenario.

In accordance with another aspect of the invention, a computer-readable medium is provided with the computer program element as described in the foregoing and in the following.

A computer-readable medium may be a volatile or non-volatile storage medium, for instance a disk drive, a CD, and DVD, a diskette, a storage card, or any other desired computer-readable medium or storage medium.

Exemplary embodiments of the invention shall be described in the following with reference to the figures.

DETAILED DESCRIPTION OF EXEMPLARY EMBODIMENTS

Figure 1:
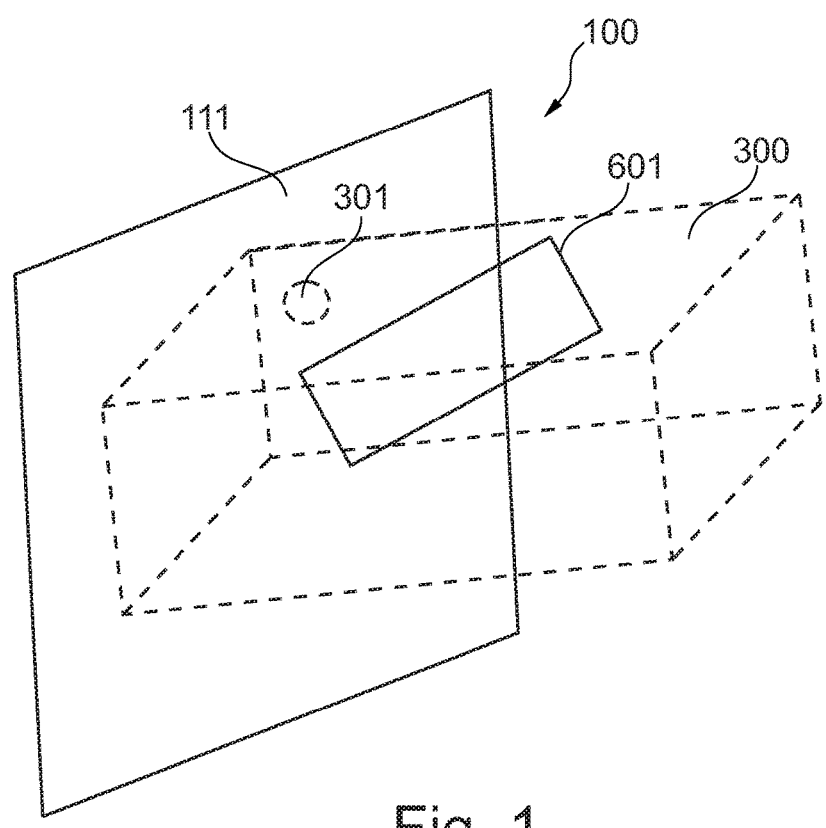
FIG. 1 is a perspective elevation of a representation device in accordance with one exemplary embodiment of the invention.

FIG. 1 depicts a representation device 100 for representing a three-dimensional virtual scenario 300 having a representation region 111. A virtual object 301 and a virtual surface area 601 are disposed in the three-dimensional virtual scenario 300.

The virtual surface area 601 is embodied such that a marking element may be moved along on it. The marking element may move in two directions within the three-dimensional virtual scenario 300.

Figure 2:
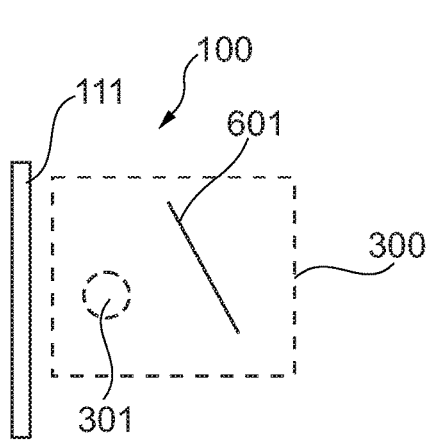
FIG. 2 is a side view of a representation device in accordance with another exemplary embodiment of the invention.

FIG. 2 depicts a side view of the representation device 100 having a representation region 111 for representing a three-dimensional virtual scenario 300.

The virtual surface area 601 and the virtual object 301 are disposed in the three-dimensional virtual scenario.

The virtual surface area 601 may be arranged as desired in the three-dimensional virtual scenario. This means that, for example, an inclination and a position of the virtual surface area may be adjusted.

If the position of the virtual surface area 601 is changed, this may lead to the virtual location of a virtual object 301 changing with respect to the virtual surface area 601. In FIG. 2, the virtual surface area 601 is arranged such that the virtual object 301 is disposed between the representation region 111 and the virtual surface area 601.

However, the virtual surface area 601 may also be arranged such that it is disposed between one or a plurality of virtual objects 301 and the representation region 111.

In principle the position of the virtual surface area in the three-dimensional virtual scenario does not effect any change in the method for selecting a virtual object.

If a virtual object to be selected is disposed between the virtual surface area and the viewer's eye, the virtual object is selected in that the connecting line from the viewer's eye to the marking element runs through the virtual coordinates of the location of the virtual object.

If the virtual object to be selected is disposed between the virtual surface area and the representation unit, the virtual object is selected in that the connecting line is extended into the three-dimensional virtual scenario and there runs through the coordinates for the location of the virtual object.

Figure 3:
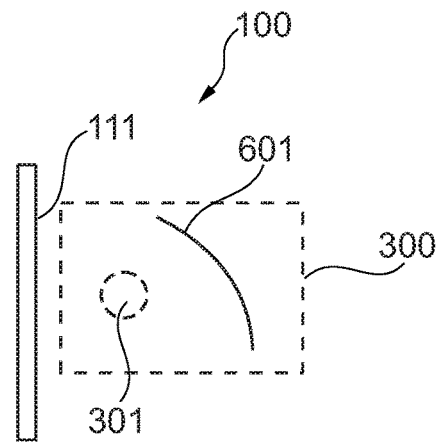
FIG. 3 is a side view of a representation device in accordance with another exemplary embodiment of the invention.

FIG. 3 depicts a representation device 100 having a representation region 111 for a three-dimensional virtual scene 300, wherein a virtual object 301 and a virtual surface area 601 are depicted in the three-dimensional virtual scene.

The virtual surface area is embodied in the shape of a circular arc or in the shape of a hollow cylindrical arc, the spatial equivalent thereof. A marking element may move along the surface of the virtual surface area.

Figure 4:
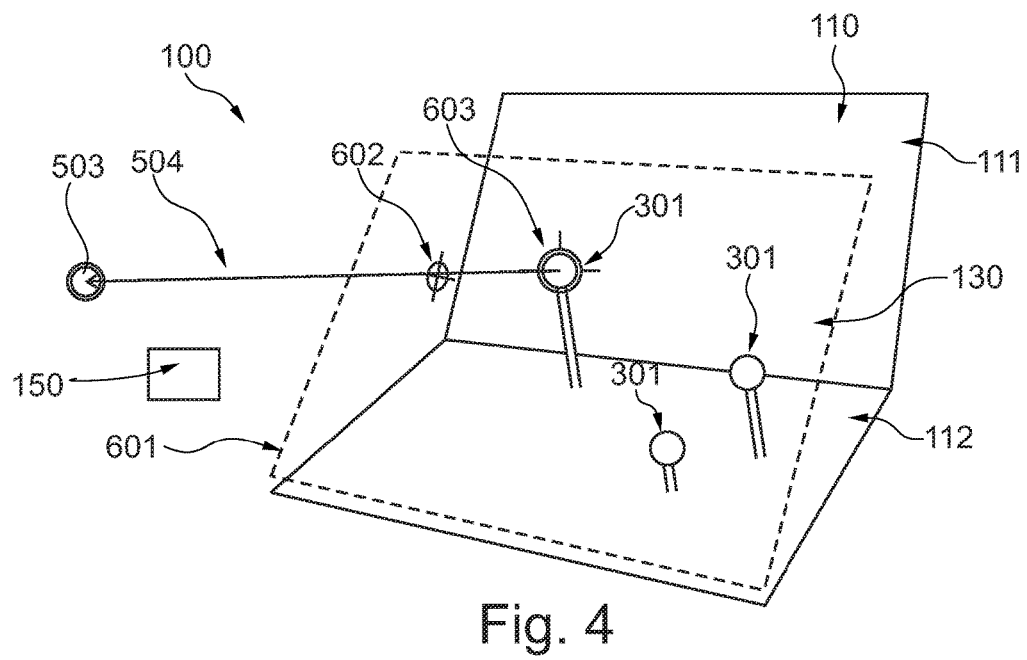
FIG. 4 is a view of a representation device in accordance with one exemplary embodiment of the invention.

FIG. 4 depicts a representation device 100 for a three-dimensional virtual scenario having a representation unit 110 with a first representation region 111 and a second representation region 112. Virtual three-dimensional objects 301 are reproduced in the representation space 130.

Arranged in the three-dimensional virtual scene is a virtual surface area 601 on which a marking element 602 may be moved. The marking element 602 moves only on the virtual surface area 601, so that the marking element 602 has two translational degrees of freedom in its movement. In other words, the marking element 602 is designed to perform a two-dimensional movement. Thus the marking element may be controlled, for example, by means of a conventional computer mouse.

A virtual object in the three-dimensional scenario is selected in that the position of at least one of a viewer's eyes 503 is detected and a connecting line 504 from the determined position of the eye 503 into the three-dimensional scenario in the representation space 130 is calculated using the marking element 602.

The position of the eye may be detected for instance in that the user wears eyeglasses with reflectors and a camera system detects the position of the reflectors. However, other methods may also be used for detecting the position of the eye.

The connecting line may of course also be calculated starting from a position averaged for both eyes of the viewer. In addition, the position of the user's eyes may be calculated with or without eyeglasses having appropriate reflectors. It should be noted that, with respect to the invention, any mechanisms and methods for determining the position of the eyes may be used.

The virtual object 301 in the three-dimensional scenario is selected in that the connecting line 504 is extended into the representation space 130 and the virtual object whose virtual coordinates are intersected by the connecting line 504 is selected. A virtual object 301 is then selected for instance by means of a selection indicator 603.

Naturally the virtual surface area 601 on which the marking element 602 moves may also be arranged in the virtual scenario in the representation space 130 such that from the point of view of the user virtual objects 301 are disposed in front of and/or behind the virtual surface area 601.

As soon as the marking element 602 is moved on the virtual surface area 601 such that the connecting line 504 intersects the coordinates of a virtual object 301, the marking element 602 may be represented in the three-dimensional scenario such that, with additional depth information or a change in the depth information, it adopts the virtual three-dimensional coordinates of the selected object. From the point of view of the user, this change is then represented such that, as soon as a virtual object 301 is selected, the marking element 602 makes a spatial movement toward the user or away from the user.

This permits interaction with virtual objects in three-dimensional scenarios by means of two-dimensional interaction devices that are easy to handle, such as for instance a computer mouse, i.e. by means of interaction devices that have two translational degrees of freedom. In contrast to special three-dimensional interaction devices having three degrees of freedom, this permits simpler and easier to learn interaction with a three-dimensional scenario, since an input device having fewer degrees of freedom is used for the interaction.

Naturally virtual objects may also be represented in the three-dimensional scenario such that the coordinates of the objects in the virtual scenario appear from the point of view of the user as if the virtual objects are disposed behind the visualization surface of the representation device.

Figure 5:
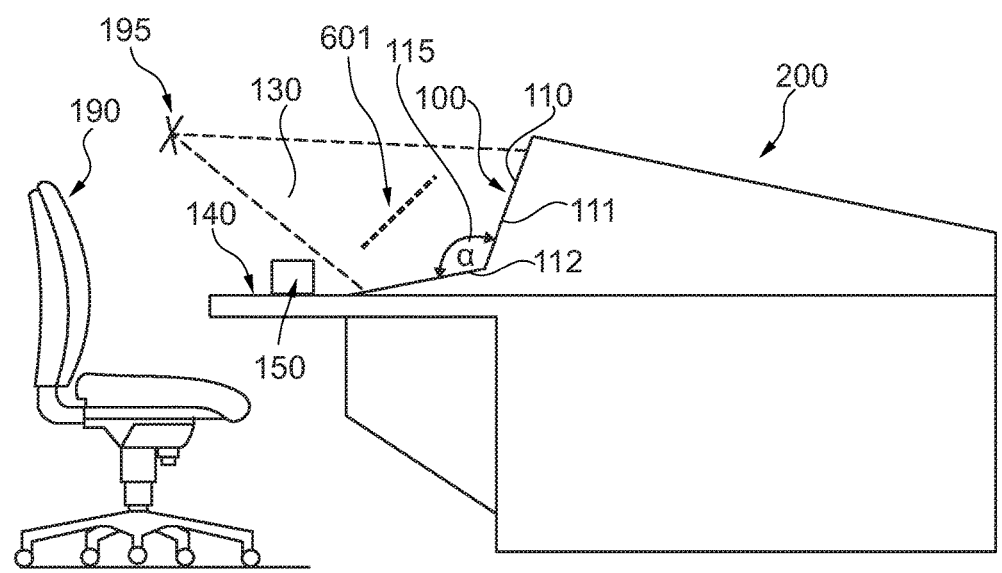
FIG. 5 is a side view of a workstation device in accordance with one exemplary embodiment of the invention.

FIG. 5 depicts a workstation device 200 for depicting a three-dimensional virtual scenario and for interacting with the virtual scenario.

The workstation device 200 has a representation device 100 having a representation unit 110.

The representation unit 110 has a first representation region 111 and a second representation region 112, wherein the second representation region is angled, relative to the first representation region, toward the user such that the two representation regions form an included angle α 115.

With their angled position relative to a viewer position 195, i.e. the eye position of the viewer, the first representation region 111 of the representation unit 110 and the second representation region 112 of the representation unit 110 cover a representation space 130 for the three-dimensional virtual scenario.

The representation space 130 is thus the spatial volume in which the visible three-dimensional virtual scene is represented.

A viewer who uses the seat 190 while using the workstation device 200, in addition to using the representation space 130 for the three-dimensional virtual scenario, can also use a workstation region 140 on which additional touch-sensitive or conventional displays may be disposed.

The included angle α 115 may be dimensioned such that all virtual objects in the representation space 130 are disposed within arm's reach of the user of the workstation device 200. There is good adaptation to the arm's reach of the user in particular with an included angle α that is between 90 degrees and 150 degrees. The included angle α may for instance also be adapted to the individual requirements of an individual user and may thus fall below or exceed the range of 90 degrees to 150 degrees. In one exemplary embodiment, the included angle α is 120 degrees.

For monitoring air space, the three-dimensional virtual scenario may be depicted for instance such that the second representation region 112 of the representation unit 110 is the virtually displayed surface of the earth or a reference surface in the space.

Thus the inventive workstation device is suitable in particular for lengthier, low-fatigue processing of three-dimensional virtual scenarios with integrated spatial representation of geographically referenced data, such as e.g. aircraft, waypoints, control zones, threat spaces, terrain topographies, and weather events, with simple intuitive interaction options.

The workstation device as described in the foregoing and in the following thus permits a large stereoscopic representation volume or a representation region. Furthermore, the workstation device permits a virtual reference surface to be positioned in the virtual three-dimensional scenario, for instance a terrain surface, in the same plane as the representation region or touch unit actually present.

Figure 6:
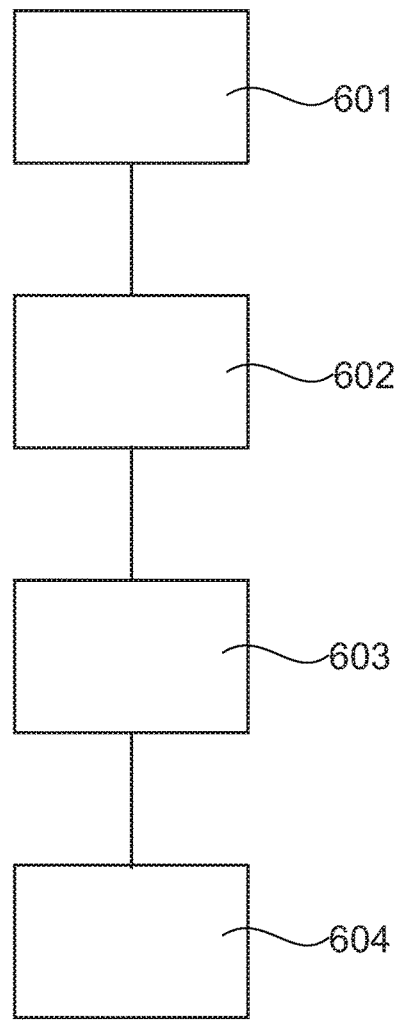
FIG. 6 is a view of method in accordance with one exemplary embodiment of the invention.

FIG. 6 is a schematic depiction of a method for selecting virtual objects in a three-dimensional virtual scenario having the following steps: reproducing a marking element in a three-dimensional virtual scenario 601, moving the marking element with two degrees of freedom along a virtual surface area 602, determining a connecting line from one eye of the viewer to the marking element 603, and selecting a virtual object in the three-dimensional virtual scenario by positioning the marking element in a certain region on the virtual surface area 604.

The object may be selected in that the marking element is moved on the virtual surface area such that the connecting line from the eye of the viewer to the marking element intersects a virtual location of the virtual object to be selected in the three-dimensional virtual scenario.

Figure 7:
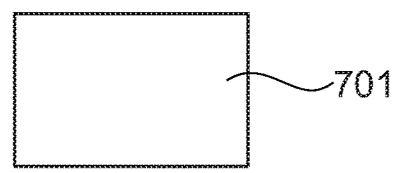
FIG. 7 is a view of a computer-readable medium in accordance with one exemplary embodiment of the invention.

FIG. 7 depicts a computer-readable medium 701 having a computer program element for controlling a representation device as described in the foregoing and in the following that is embodied for performing the method for selecting virtual objects in a three-dimensional virtual scenario when the computer program element is executed on a processor of a machine.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof

The invention claimed is:

1. A representation device comprising a processor and configured for representing and interacting with a three-dimensional virtual scenario and for interacting therewith, the representation device comprising:
at least one representation region configured to represent the three-dimensional scenario; and
an input unit configured to select a virtual object in the three-dimensional virtual scenario by controlling a movement of a marking element in the three-dimensional virtual scenario, wherein the movement has two degrees of freedom,
wherein the movement of the marking element with the two degrees of freedom occurs in a virtual surface area,
wherein the selection of the virtual object in the three-dimensional virtual scenario is achieved by detecting at least one eye of a user and calculating a connecting line based on the detected position of the eye and the position of the marking element in the virtual surface area and extending the connecting line into the virtual three-dimensional scenario,
wherein the marking element is moved on the virtual surface area such that, if the connecting line intersects the coordinates of the virtual object, the marking element can be represented in the three-dimensional scenario such that it adopts the virtual three-dimensional coordinates of the selected object with additional depth information, and
wherein the virtual surface area is shaped in a circular or rounded manner, or as a hemisphere or sphere.

2. The representation device of claim 1, wherein the virtual surface area is a plane.

3. The representation device of claim 1, wherein the virtual surface area is a circular arc.

4. The representation device of claim 1, wherein the arrangement of the virtual surface area in the three-dimensional virtual scenario is changeable.

5. A workstation device for representing and operating a three-dimensional virtual scenario, the workstation device comprising:
a representation device, which includes
a processor;
at least one representation region configured to represent the three-dimensional scenario; and
an input unit configured to select a virtual object in the three-dimensional virtual scenario by controlling a movement of a marking element in the three-dimensional virtual scenario, wherein the movement has two degrees of freedom,
wherein the movement of the marking element with the two degrees of freedom occurs in a virtual surface area,
wherein the selection of the virtual object in the three-dimensional virtual scenario is achieved by detecting at least one eye of a user and calculating a connecting line based on the detected position of the eye and the position of the marking element in the virtual surface area and extending the connecting line into the virtual three-dimensional scenario, wherein the marking element is moved on the virtual surface area such that, if the connecting line intersects the coordinates of the virtual object, the marking element can be represented in the three-dimensional scenario such that it adopts the virtual three-dimensional coordinates of the selected object with additional depth information, and wherein the virtual surface area is shaped in a circular or rounded manner, or as a hemisphere or sphere.

6. The workstation device of claim 5, wherein the workstation device is configured to represent and monitor air spaces.

7. The workstation device of claim 5, wherein the workstation device is an air traffic control workstation.

8. The workstation device of claim 5, wherein the workstation device is configured to monitor and control unmanned aircraft.

9. A method for selecting virtual objects in a three-dimensional virtual scenario comprising the steps:

reproducing a marking element in the three-dimensional virtual scenario;

moving the marking element with two degrees of freedom along a virtual surface area; and selecting a virtual object in the three-dimensional virtual scenario by positioning the marking element in a certain region on the virtual surface area, wherein the selection of the virtual object in the three-dimensional virtual scenario is achieved by detecting at least one eye of a user and calculating a connecting line based on the detected position of the eye and the position of the marking element in the virtual surface area and extending the connecting line into the virtual three-dimensional scenario, wherein the marking element is moved on the virtual surface area such that, if the connecting line intersects the coordinates of the virtual object, the marking element can be represented in the three-dimensional scenario such that it adopts the virtual three-dimensional coordinates of the selected object with additional depth information, and wherein the virtual surface area is shaped in a circular or rounded manner, or as a hemisphere or sphere.

10. The method in accordance with claim 9, further comprising the step:

determining a connecting line from an eye of the viewer to the marking element, wherein the determination of the connecting line occurs prior to the selection of the virtual object;

wherein the object is selected by moving the marking element on the virtual surface area such that the connecting line intersects a virtual location of the virtual object in the three-dimensional virtual scenario.

11. A non-transitory computer-readable medium, which when executed on a processor performs the steps:

reproducing a marking element in the three-dimensional virtual scenario;

moving the marking element with two degrees of freedom along a virtual surface area; and selecting a virtual object in the three-dimensional virtual scenario by positioning the marking element in a certain region on the virtual surface area, wherein the selection of the virtual object in the three-dimensional virtual scenario is achieved by detecting at least one eye of a user and calculating a connecting line based on the detected position of the eye and the position of the marking element in the virtual surface area and extending the connecting line into the virtual three-dimensional scenario, wherein the marking element is moved on the virtual surface area such that, if the connecting line intersects the coordinates of the virtual object, the marking element can be represented in the three-dimensional scenario such that it adopts the virtual three-dimensional coordinates of the selected object with additional depth information, and wherein the virtual surface area is shaped in a circular or rounded manner, or as a hemisphere or sphere.

12. The non-transitory computer-readable medium of claim 11, which when executed on a processor performs the further step:

determining a connecting line from an eye of the viewer to the marking element, wherein the determination of the connecting line occurs prior to the selection of the virtual object;

wherein the object is selected by moving the marking element on the virtual surface area such that the connecting line intersects a virtual location of the virtual object in the three-dimensional virtual scenario.

* * * * *